United States Patent [19]
Shibata et al.

[11] 3,892,952
[45] July 1, 1975

[54] DIGITAL DIFFERENTIATION CIRCUIT

[75] Inventors: Akira Shibata, Okazaki; Atutoshi Okamoto, Toyohashi, both of Japan

[73] Assignee: Nippondenso Co., Ltd., Kariya, Japan

[22] Filed: Mar. 20, 1974

[21] Appl. No.: 453,160

[30] Foreign Application Priority Data

Mar. 22, 1973  Japan.............................. 48-33211

[52] U.S. Cl. ..... 235/151.32; 235/150.2; 303/21 CF; 317/5; 324/160
[51] Int. Cl. .......................................... G06f 15/20
[58] Field of Search....... 235/151.32, 150.2, 150.24, 235/92 TF, 92 FQ, 92 AE; 324/160, 161, 162, 163, 166, 178; 246/182 R, 182 C; 317/5; 303/21 R, 21 CE, 21 CF, 21 C; 328/63, 72, 74, 179; 307/269

[56] References Cited
UNITED STATES PATENTS

| | | | |
|---|---|---|---|
| 3,639,753 | 2/1972 | Reich............................. | 246/182 C |
| 3,655,962 | 4/1972 | Koch............................. | 235/150.2 X |
| 3,757,167 | 9/1973 | Yoshikawa et al. ......... | 303/21 CF X |
| 3,780,346 | 7/1972 | Gagnon................................. | 317/5 |

*Primary Examiner*—Joseph F. Ruggiero
*Attorney, Agent, or Firm*—Cushman, Darby & Cushman

[57] ABSTRACT

The present invention provides a digital differentiation circuit comprising a reference pulse generating circuit for generating reference pulses having a predetermined frequency, a speed detector for generating output pulses having a frequency proportional to a vehicle speed to be measured, and a timing pulse generating circuit for generating reference timing pulses, wherein the leading edge of the detector output pulse and the leading edge of the reference timing pulse are synchronized with the reference pulse, and the trailing edge of the reference timing pulse is extended to the leading edge of the first detector output pulse appearing after the end of the duration of the reference timing pulse to determine a counting period, whereby the number of the detector output pulses and the number of the reference pulses received during this extended counting period are respectively counted by a first and second counters, and the counts of the first and second counters are subjected to the operation of division to obtain a speed which is subjected to the operation of subtraction with the previously obtained speed.

9 Claims, 9 Drawing Figures

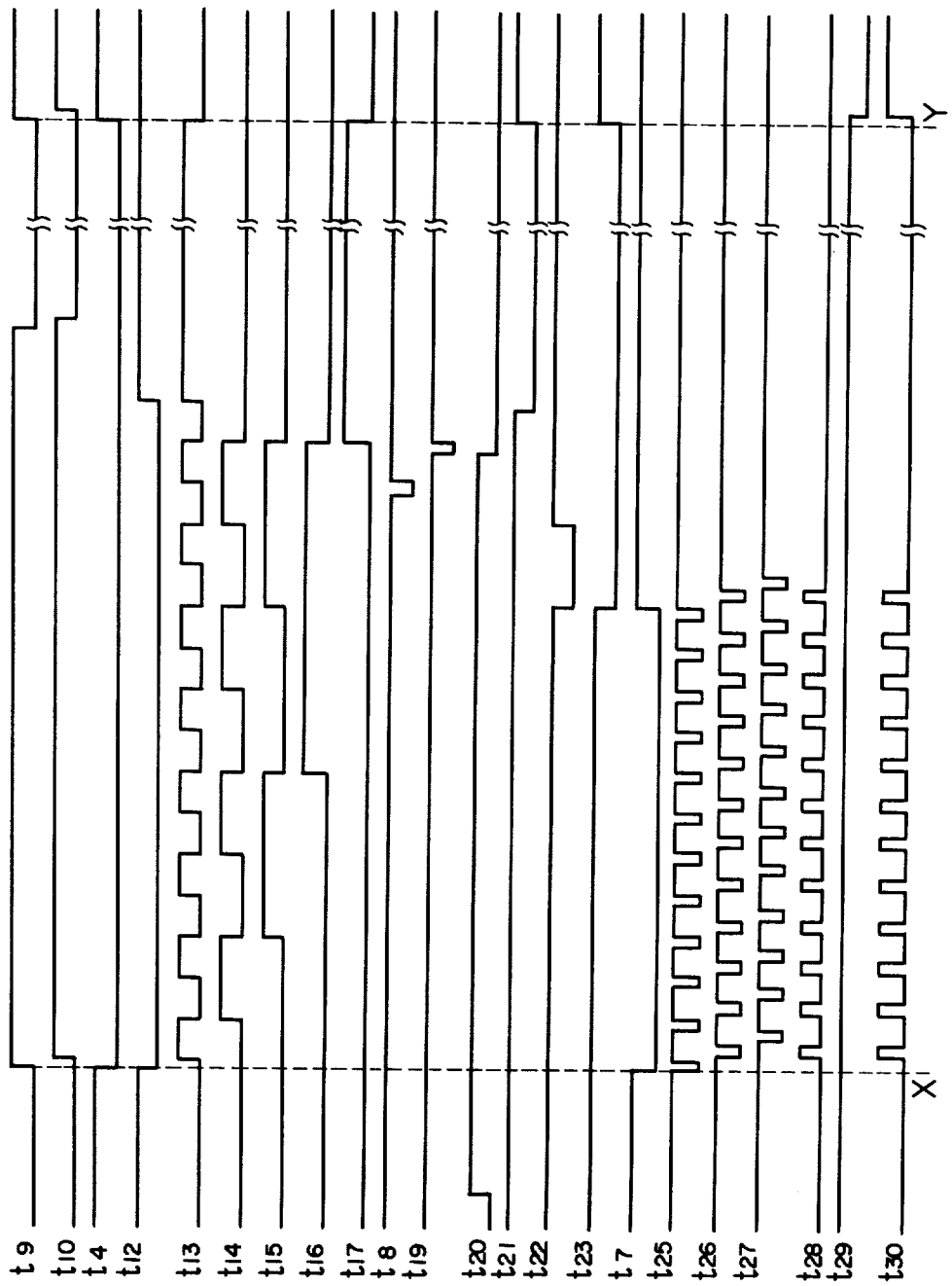

DIGITAL DIFFERENTIATION CIRCUIT

BACKGROUND OF THE INVENTION

1. FIELD OF THE INVENTION

The present invention relates to a digital differentiation circuit constituting part of a digital computer for an automobile anti-skid system, which receives as an input the output pulses of a vehicle speed signal generating circuit.

2. DESCRIPTION OF THE PRIOR ART

The conventional digital differentiation circuits are generally of the type in which as shown in FIG. 1, the number of pulses received during a first reference time period TO is counted (the count is designated as P1) and then the number of pulses received during the next time period TO is counted (the count is designated as P2), whereby the difference between the two counts (P1 − P2 or P2 − P1) is obtained to provide the differentiated output. A disadvantage of digital differentiation circuit of this type is that while the reference time period TO is fixed, the period of input pulses varies over a wide range with the result that while the time at which counting starts may be synchronized with the rise or fall of the input pulse, it is impossible to synchronize the time at which the counting terminates with the rise or fall of the input pulse. Therefore, when the number of input pulses is counted by a counter, this gives rise to a counting error equal to one pulse depending on the state of the input pulse arriving at the instant when the counting is terminated. In other words, if the number of input pulses received during the time period TO is 100, there exists an error in count of 1 %. Further, if the length of the reference period TO is increased by for example 2 times to reduce this error in count, the error in count will be reduced to half, whereas the error will be reduced to one third if the length of the reference period TO is increased by three times. However, this gives rise to a problem that the response time of the circuit will be doubled if the reference period TO is doubled, whereas the response time will be tripled if the reference period TO is tripled.

It is thus evident in the conventional digital differentiation circuit that reducing the error in count results in deteriorating the response characteristic, whereas improving the response characteristic results in increasing the error in count.

SUMMARY OF THE INVENTION

With a view to overcoming the foregoing difficulty, it is an object of the present invention to provide a digital differentiation circuit comprising a reference pulse generating circuit for generating reference pulses having a predetermined frequency, a displacement speed sensor for generating output pulses having a frequency proportional to a displacement speed, a timing pulse generating circuit for generating reference timing pulses, a synchronization circuit whereby the reference pulse is synchronized with the leading edge of the sensor output pulse and the sensor output pulse is synchronized with the leading edge of the reference timing pulse generated from the timing pulse generating circuit to extend the trailing edge of the reference timing pulse to the leading edge of the first sensor output pulse arriving after the termination of the reference timing pulse and synchronized with the leading edge of a second reference timing pulse and thereby to determine a counting period equal to the duration of the reference timing pulse extended by less than one-pulse-period of the sensor output pulses, a first counter for counting the number of the sensor output pulses received during the counting period, a second counter for counting the number of the reference pulses received during the counting period, a divider circuit for performing the operation of division on the count of the sensor output pulses and the count of the reference pulses to obtain a displacement speed, and a subtractor circuit for performing, after the completion of the division, the operation of subtraction on the thus obtained displacement speed and the previously obtained displacement speed to measure an acceleration or deceleration of displacement speed. Thus, the digital differentiation circuit provided according to the present invention ensures a considerably reduced differentiation error as well as excellent response characteristics.

The digital differentiation circuit according to the present invention has among its great advantages the fact that it comprises a reference pulse generating circuit for generating reference pulses having a predetermined frequency, displacement speed detector for generating output pulses having a frequency proportional to a displacement speed, a timing pulse generating circuit, a synchronization circuit whereby the reference pulse is synchronized with the leading edge of the detector output pulse and the output pulse is synchronized with the leading edge of the reference timing pulse to extend the trailing edge of the reference timing pulse to the leading edge of the first output pulse arriving after the termination of the reference timing pulse and synchronized with the leading edge of a second reference timing pulse and thereby to determine a counting period corresponding to the duration of the reference timing pulse extended by less than one-pulse-period of the detector output pulses, a first counter for counting the number of the detector output pulses received during the counting period in response to a signal from the timing pulse generating circuit which directs the initiation of a counting operation, a second counter for counting the number of the reference pulses received during the counting period in response to a signal from the timing pulse generating circuit which directs the initiation of a counting operation, a divider circuit for performing the operation of division on the count of the detector output pulses and the count of the reference pulses to obtain a displacement speed in response to a signal which directs the initiation of a division, and a subtractor circuit for performing a subtraction on the thus obtained displacement speed and the previously obtained displacement speed to determine an acceleration or deceleration in the displacement speed in response to a subtraction command signal generated from the timing pulse generating circuit after the termination of the division, whereby ensuring a considerably reduced differentiation error and shorter response time of the circuitry.

BRIEF DESCRIPTION OF THE DRAWING

FIG. 5 is a timing chart showing waveforms generated at various points in the circuit of FIGS. 4a, 4b and 4c.

DESCRIPTION OF THE PREFERRED EMBODIMENT

The present invetion will now be described with reference to the illustrated embodiment. In the illustrated embodiment the digital differentiation circuit in accordance with the present invention constitutes part of a digital computer for an anti-skid system, which receives as input signals the pulse signals from a speed sensor installed in an automobile, and by using this digital differentiation circuit having a considerably reduced differentiation error and reduced response time, the acceleration or deceleration of the wheel is detected in accordance with the pulse signals from the speed sensor.

Figure 1:
FIG. 1 is a timing chart useful for explaining the operation of a prior art digital differentiation circuit.
Figure 2:
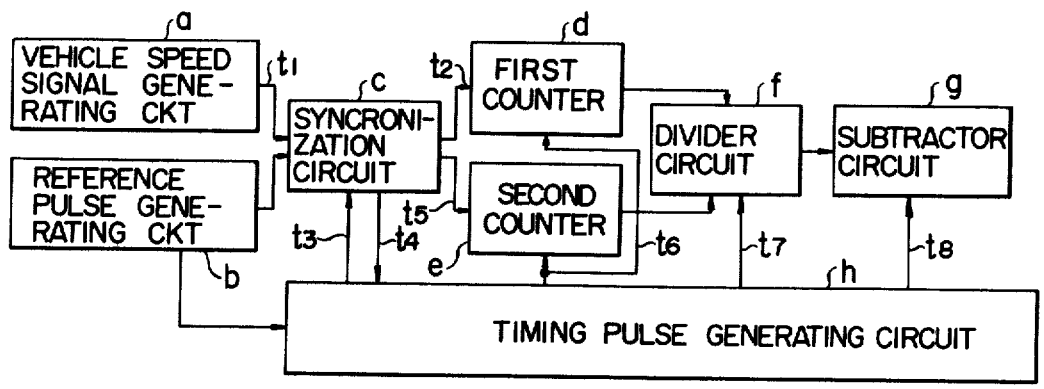
FIG. 2 is a block diagram showing an embodiment of a digital differentiation circuit according to the present invetion.
Figure 3:
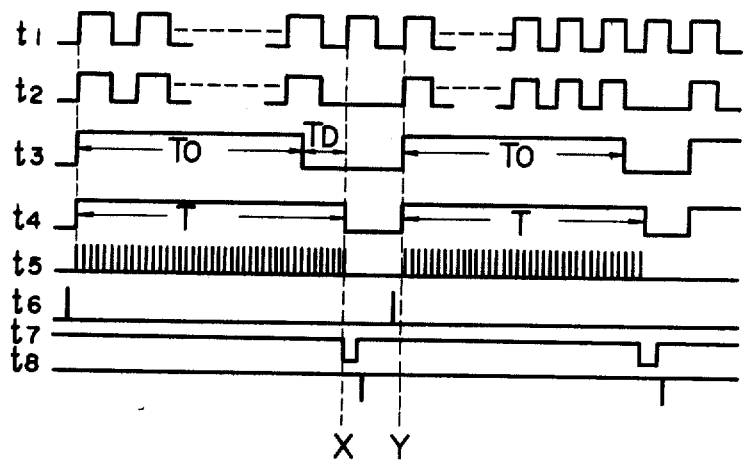
FIG. 3 is a timing chart for explaining the principle of the digital differentiation circuit according to the present invention.

FIG. 2 illustrates a block diagram of an embodiment of the invention for explaining its principle, and FIG. 3 illustrates a timing chart for the embodiment of FIG. 2.

In FIG. 2, letter $a$ designates a vehicle speed signal generating circuit for generating output pulses having a frequency corresponding to the vehicle speed detected by a displacement speed detector comprising a speed sensor, $b$ a reference pulse generating circuit, $c$ a synchronization circuit wherein the output pulses of the vehicle speed signal generating circuit $a$ are synchronized with the output pulses, i.e., reference pulses from the reference pulse generating circuit $b$, and then the leading and trailing edges of a reference timing pulse are synchronized with the synchronized output pulses of the vehicle speed signal generating circuit $a$ to determine a counting period, $d$ a first counter for counting the number of the output pulses of the vehicle speed signal generating circuit $a$ synchronized with the reference pulses in the synchronization circuit $c$ and received during the determined counting period, $e$ a second counter for counting the number of the reference pulses synchronized with the output pulses of the vehicle speed signal generating circuit $a$ in the synchronization circuit $c$ and received during the counting period, $f$ a divider circuit in which the count of the first counter is divided by the count of the second counter to obtain a displacement speed, $g$ a subtractor circuit for producing the acceleration or deceleration of the displacement (differentiated output) from the displacement speeds produced by the divider circuit $f$, $h$ a timing pulse generating circuit for controlling the operation of the entire circuitry.

The principle of the present invention will now be described with reference to the timing chart of FIG. 3 in addition to the block diagram of FIG. 2. In FIG. 3, $t$ is the waveform of the output pulses of the vehicle speed signal generating circuit $a$. It is now assumed that the first and second counters start counting at a moment when the output pulse of the vehicle speed signal generating circuit $a$ and the reference pulse are applied to the synchronization circuit c and when in the synchronization circuit c the reference pulse first changes from the logical "0" to the logical "1" after the output pulse of the vehicle speed signal generating circuit $a$ has changed from the logical 0 to the logical 1. By that time, the first and second counters $d$ and $e$ have been reset by a counter reset signal $t6$ so that the first and second counters are prepared to start counting. When the counter in the timing pulse generating circuit $a$ counts a reference time period TO, as shown by a waveform $t3$, the output signal of the timing pulse generating circuit $h$ changes from the logical 1 to the logical 0. The first and second counters $d$ and $e$ stop counting at the instant when the first transition from the logical 0 to 1 of the output pulse of the vehicle speed signal generating circuit $a$ occurs after the output signal t3 $t3$ the timing pulse generating circuit $h$ has changed from the logical 1 to 0. Consequently, the actual counting period T becomes as shown at $t4$ in FIG. 3. The waveform $t4$ indicates the output pulses of the vehicle speed signal generating circuit $a$ synchronized with the reference pulses in the synchronization circuit $c$, and they are counted by the first counter $d$. The waveform indicated at $t5$ shows the reference pulses which are counted by the second counter $e$. When the counting period is terminated by the signal $t4$, assuming that NN represents the count of the first counter $d$ and NT represents the count of the second counter $e$, the operation of division NN/NT is performed by the divider circuit $f$ during the time in which a signal $t7$ generated from the timing pulse generating circuit $h$ remains at the logical 0. Assuming that V1 shows the result of the first division and V2 is the result of the second division, at the instant that the second division is completed, the subtraction V1 − V2 is performed in the subtractor circuit $g$. Upon completion of the subtraction in the subtractor circuit $g$, the reset signal t6 is generated from the timing pulse generating circuit $h$ so that the first and second counters $d$ and $e$ are reset and placed in condition for the next counting action.

With the construction described above, the digital differentiation circuit according to this invention ensures a considerably reduced differentiation error and reduced response time. These features will be described hereunder.

Firstly, while the first and second counters $d$ and $e$ start counting in synchronism with the rise of the output pulse of the vehicle speed signal generating circuit $a$ and initially count their response input pulses during the reference period TO, if the reference period TO is not in synchronism with the rise of the output pulse of the vehicle speed signal generating circuit $a$ at the end of the reference period TO, then the counting is extended by the minimum time period TD necessary for causing the reference time period TO to be synchronized with the rise of the output pulse of the vehicle speed signal generating circuit $a$. Thus, the actual counting period T is given as $$T = TO + TD \tag{1}$$

If the counts of the second and first counters $e$ and $d$ obtained during the counting period T are respectively represented as above-mentioned NT and NN, and if fw and tw represent respectively the frequency and period of the output pulse of the vehicle speed signal generating circuit $a$ and fc and tc the frequency and period of the reference pulse, then we obtain $$NN = fw \cdot T \tag{2}$$

$$NT = fc \cdot T \tag{3}$$

However, since the end of counting period is synchronized with the rise of the output pulse of the vehicle speed signal generating circuit $a$, the reference pulse is not in synchronism with the counting period T at the end of the counting. Consequently, the second counter $e$ shows an error in count which is equal to one pulse, and if $\xi 1$ represents the error, we obtain $$\xi 1 = 1/NT \tag{4}$$

On the other hand, if the count NN of the first counter $d$ and the count NT of the second counter $e$ are subjected to the operation NN/NT in the divider circuit $f$, then a speed V proportional to the output of the speed sensor is obtained as follows $$V = K \frac{NN}{NT} \tag{5}$$

where $K$ is a proportionality constant. In this embodiment, the differentiated output is obtained from the speed $V$ proportional to the output pulses of the vehicle speed signal generating circuit $a$. In other words, if V1 represents the result of a first division and V2 the result of a second division, then the difference therebetween is given by the following operation $$Df = V1 - V2 \tag{6}$$

or $$Dr = V2 - V1 \tag{7}$$

and $Df$ or $Dr$ represents the differentiated output. In this case, the counting period $T$ is given as $$T = \left(\left[\frac{TO}{tw}\right] + 1\right) tw \tag{8}$$

where, if $ki \leq (TO/tw) < ki + 1$, then $$\left[\frac{TO}{tw}\right] = ki$$

$ki = 0, 1, 2, 3$, etc. (i.e., $ki$ is a positive integer including 0)

Therefore, the counting period T varies in dependence on the output pulse period tw of the vehicle speed signal generating circuit $a$. If the time interval required for the first differentiation to end and the second differentiation to start is designed as one-cycle time TP, it is given as $$TP = T + tw \tag{9}$$

Consequently, the cycle time TP varies in accordance with the output pulse period tw of the vehicle speed signal generating circuit $a$. Further, a differentiation error $\xi 0$ is given as the sum of the counting error $\xi 1$ obtained from equation (4) and a division error $\xi 2$, as follows $$\xi 0 = \xi 1 + \xi 2 \tag{10}$$

If the number of significant bits for the speed V is 12 bits, then the division error is given as $(1/2^{12})$. Therefore, by selecting the value of the reference pulse frequency fc to be sufficiently small, it is practically possible to reduce the differentiation error $\xi$ to less than 0.1 %. Further, by suitably selecting the values of the reference pulse frequency fc and the reference time period TO, it is practically possible to reduce the response time TP to less than 15 msec.

Figure 6:
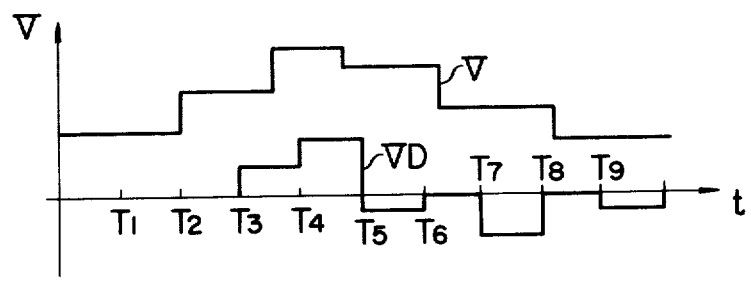
FIG. 6 is a timing chart useful for explaining the function of the digital differentiation circuit according to the present invention.

As will be seen from the foregoing description, the digital differentiation circuit according to this invention has a reduced differentiation error and shorter response time. While, in the digital differentiation circuit of this invention, the counting period is varied in accordance with the period of the output pulses from the vehicle speed signal generating circuit $a$ and the cycle time TP, i.e., the time interval between the beginning of a first differentiation and the beginning of a second differentiation is made variable, if, as in the case of a conventional differentiation, the differentiated output is obtained from the speed V by sampling the displacement speed V1 and the displacement speed V2 at intervals of a fixed sampling period TR which is not synchronized with the cycle time TP and finding the difference between V1 and V2 to produce the differentiated output, as shown in the time intervals T6 - T7 and T8 - T9 in FIG. 6, due to the counting period T being not constant, there arises a problem that a differentiated output VD becomes zero despite the fact that the speed V has been decelerating. It is of course possible to solve this problem by selecting the value of the sampling period TR sufficiently greater than that of the counting period T, but this inevitably results in a longer response time.

According to the present invention, due to the use of the variable counting period T, the cycle time TP is also made variable depending on the counting period T and the above-mentioned difficulties are thus eliminated. It will thus be seen that the present invention is a highly rational invention. Further, the actual operation of digital differentiation circuits constructed according to the circuit construction incombination with FIGS. 4a, 4b and 4c, which will be described hereunder, has proved that the digital differentiation circuit of this invention operates with a high degree of accuracy and has improved response characteristic.

Figure 7:
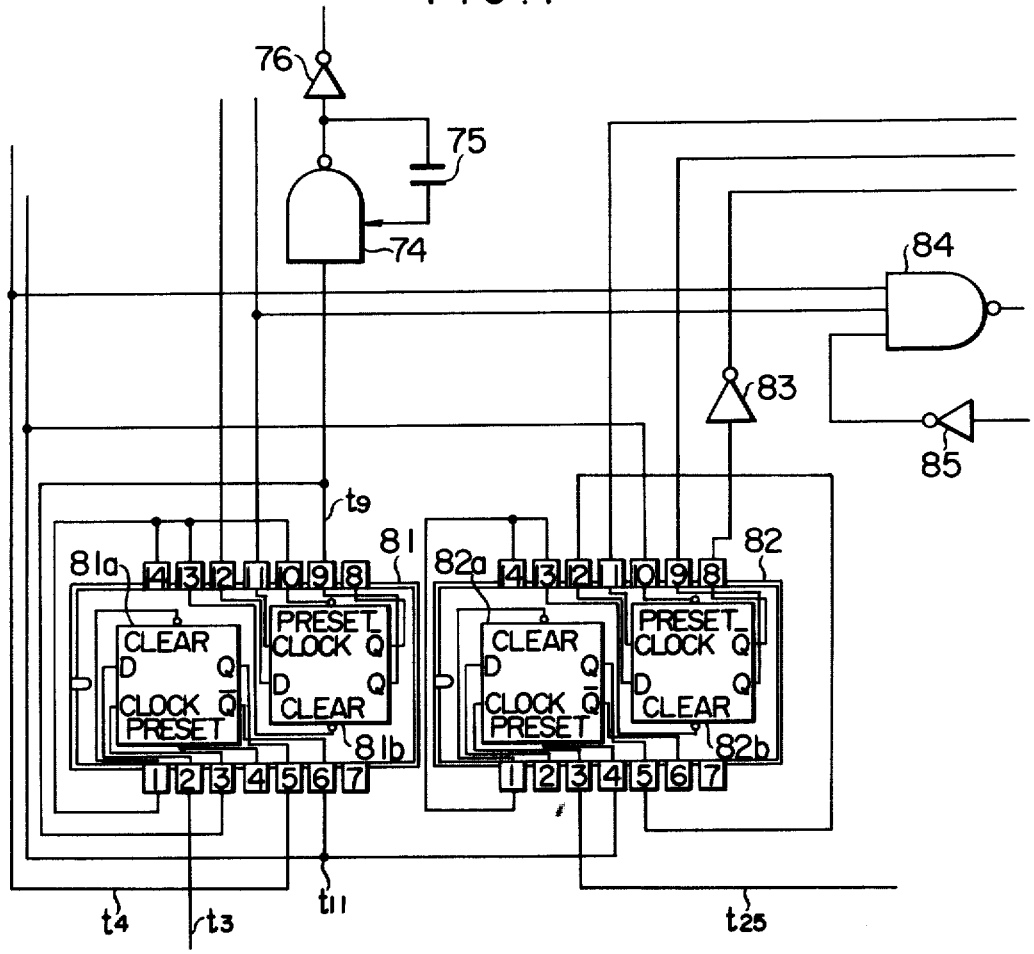
FIG. 7 is a detail circuit diagram showing the portion of the circuitry of FIG. 4a including the dual D-type flip-flops 81 and 82.

Referring now to FIGS. 4a, 4b, 4c and 7, there is shown a circuit diagram for the embodiment of this invention shown in FIG. 2. FIG. 7 shows in detail the dual D-type flip-flops 81 and 82 shown in FIG. 4a.

Figure 4A:
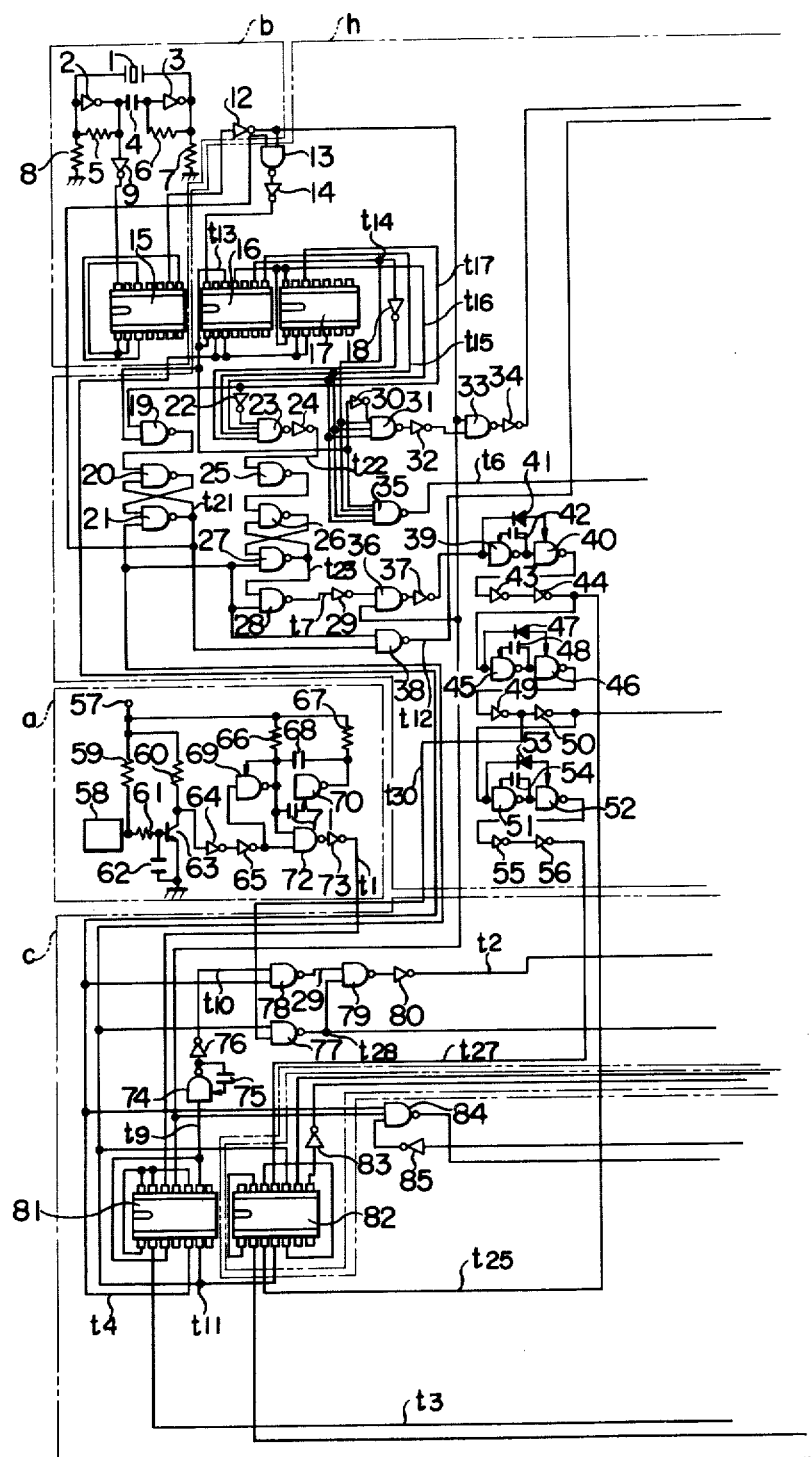
FIGS. 4a, 4b and 4c are in combination a circuit diagram for the embodiment shown in FIG. 2.
Figure 4B:
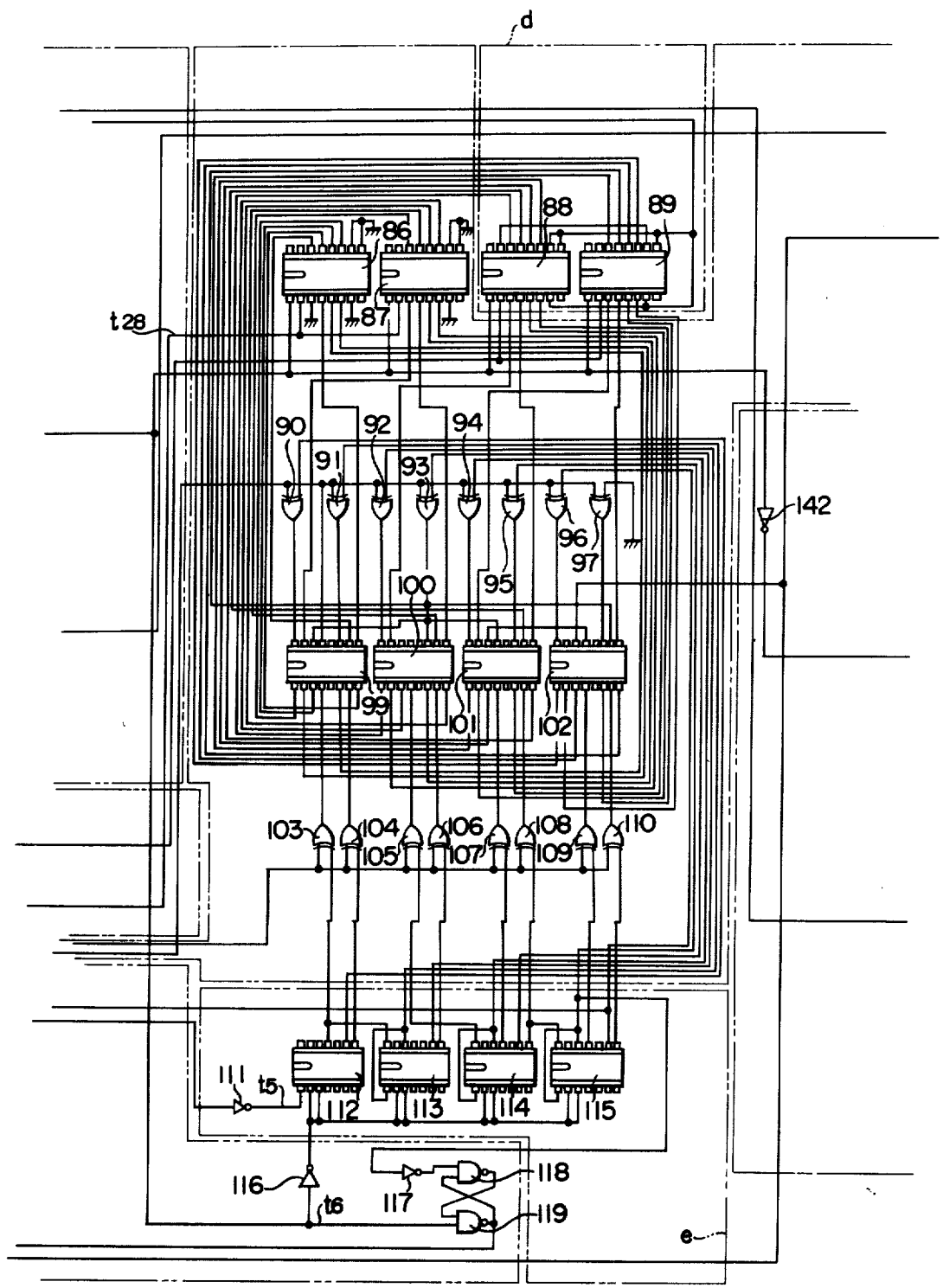
Figure 4C:
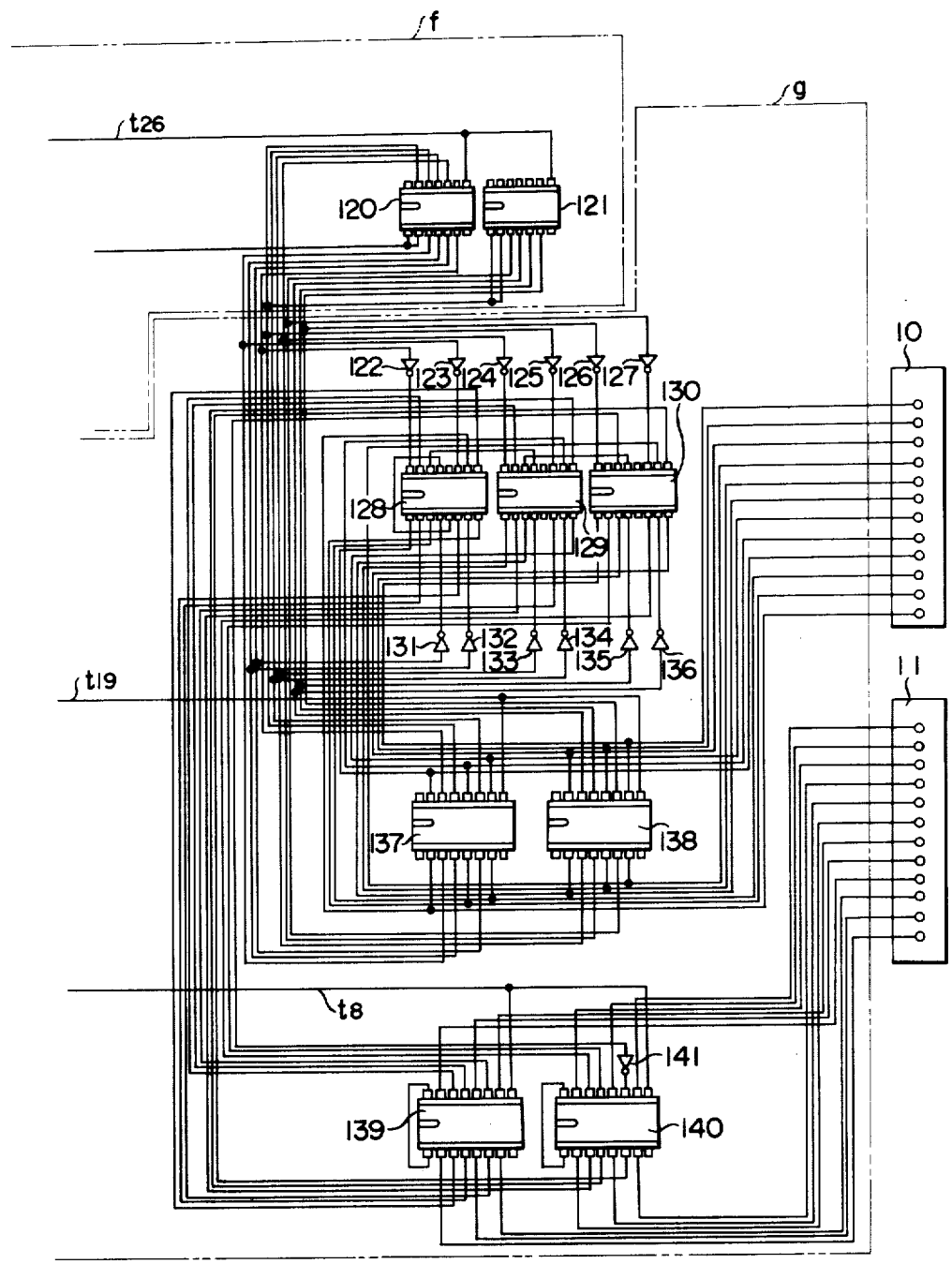

In FIGS. 4a, 4b and 4c in which those portions enclosed by two-dot chain lines correspond to the respective blocks in the block diagram of FIG. 2, numeral 1 designates a quartz crystal vibrator, 15 to 17 and 112 to 115 binary counters which are the Texas Instruments (TI) SN7493. Numeral 58 designates a speed sensor, 81 and 82 dual D-type flip-flops which comprise the TI SN7474, 86 to 89 binary synchronous counters which comprise TI SN74161, 99 to 102 and 128 to 130 four-bit binary full adders which comprise the TI SN7483. Numerals 120 and 121 designate eight-bit parallel-out shift registers comprising the TI SN74164, 137 to 140 hexa D-type flip-flops with clear input which comprise the TI SN74174. The waveforms generated at various points in the circuitry are shown in the timing charts of FIGS. 3 and 5. The circuit comprising the quartz crystal vibrator 1, NOT circuits 2, 3 and 9, a capacitor 4 and resistors 5 to 8 is a known type of crystal controlled oscillator.

In this embodiment, the crystal vibrator 1 has an oscillation frequency of 2MHz and produces output pulses of 2MHz frequency from the NOT circuit 9. The output of the NOT circuit 9 is connected to the input terminal of the binary counter 15 to divide the frequency of its input pulses by a factor of 5. In other words, output pulses whose frequency is 400 KHz are produced through a NOT circuit 12, and these 400 KHz pulses are used as reference pulses. On the other hand, numeral 57 designates +5 V power supply, and the output pulse of the speed sensor 58 is applied through a resistor 61, a transistor 63 and NOT circuits 64 and 65 to the input terminal of an astable multivibrator comprising resistors 66 and 67, capacitors 68 and 71 and NOT circuits with expander 69 and 70 and the input terminal of a NAND circuit 72.

This astable multivibrator is designed so that when it receives the output pulse of the speed sensor 58 whose period is longer than the time constant determined by the resistors 66 and 67 and the capacitors 68 and 71, it oscillates at a frequency determined by the time constant. Consequently, the output of a NOT circuit 73 produced through the NAND circuit 72 consists of the output pulses of the speed sensor 58 when the period of the output pulses from the speed sensor 58 is shorter than the time constant of the astable multivibrator, whereas the output pulses of the astable multivibrator having a frequency lower than the predetermined frequency are generated from the NOT circuit 73 when the period of the output pulses from the speed sensor 58 is longer than the time constant of the astable multivibrator. In other words, this astable multivibrator and the NAND circuit 72 constitute an initial value setting circuit whereby the generation of a braking pressure releasing signal upon the closing of the power supply is prevented to prevent the digital differentiation circuit from operating erroneously. In the discussion to follow, the output pulse of the NOT circuit 73 will be treated as the output pulse of the speed sensor 58. This output pulse is the input pulse to the synchronization circuit c which has a frequency proportional to a displacement speed. The speed sensor output pulse is coupled to the D input terminal of a sensor output pulse synchronizing flip-flop 81b in the dual D-type flip-flop 81 and the reference pulse is supplied to the clock terminal of the flip-flop 81b. When the first transition from the logical 0 to 1 of the reference pulse occurs after the speed sensor output pulse has changed from the logical 0 to 1, the output terminal Q of the D-type flip-flop 81b changes from the logical 0 to 1. The same is true when the speed sensor output pulse changes from the logical 1 to 0. Consequently, the speed sensor output pulse is synchronized with the reference pulse in the D-type flip-flop 81b. In this case, since the frequency of the reference pulse is 400 KHz, there occurs a phase difference of up to 2.5 $\mu$sec between the period of the speed sensor output pulse and the period of the Q output pulse of the D-type flip-flop 81b. This phase difference of up to 2.5 $\mu$sec corresponds to one pulse of the reference pulse and this one-pulse phase difference results in an error in count in the second counter e. The speed sensor output pulse synchronized with the reference pulse is supplied from the output terminal Q of the D-type flip-flop 81b to the clock terminal of the other reference timing pulse synchronizing D-type flip-flop 81a in the dual D-type flip-flop 81, and the output of a NAND circuit 119 is connected to the D input terminal of the D-type flip-flop 81a. When the Q output of the D-type flip-flop 81b first changes from the logical 0 to 1 after the output of the NAND circuit 119 has changed from the logical 0 to 1, the Q output signal of the D-type flip-flop 81a changes from the logical 0 to 1. And the output signal from the Q output terminal of the D-type flip-flop 81a is applied to one input terminal of a NAND circuit 78, and the speed sensor output pulse synchronized with the reference pulse is applied from the output terminal Q of the D-type flip-flop 81b to the other input terminal of the NAND circuit 78. Starting at the instant that the Q output signal of the D-type flip-flop 81a changes from the logical 0 to 1, the speed sensor output pulses synchronized with the reference pulses are supplied through the NAND circuit 78 and through a NAND circuit 79 and a NOT circuit 80 to the counters 88 and 89 in the first counter d, and the first counter d starts counting. Simultaneously, the Q output signal from the D-type flip-flop 81a is applied to one input terminal of a NAND circuit 84 and the reference pulses from the reference pulse generating circuit b are applied to the other input terminal of the NAND circuit 84. Consequently, as in the case of the first counter d, at the instant that the Q output signal of the D-type flip-flop 81a changes from the logical 0 to 1 the reference pulses are applied through a NOT circuit 111 to the counters 112 to 115 in the second counter e, and the second counter e begins counting. When the second counter e counts for the duration of a reference time period (10.24 msec in this embodiment) from the beginning of the counting, the output signal of the 13th bit in the second counter e comprising the counters 112 to 115 changes from the logical 0 to 1, whereby a RS flip-flop comprising NAND circuits 118 and 119 is reset through a NOT circuit 117, and the output of the NAND circuit 119 goes from the logical 1 to 0. As a result, at the instant that the Q output signal of the D-type flip-flop 81b first changes from the logical 0 to 1 after the output of the NAND circuit 119 connected to the D-type flip-flop 81a has changed from the logical 1 to 0, the Q output signal of the D-type flip-flop 81a changes from the logical 1 to 0, and the outputs of the NAND circuits 78 and 84 change from the logical 0 to 1. Consequently, the speed sensor output pulses synchronized with the reference pulses and the reference pulses are respectively no longer applied to the counters 88 and 89 of the first counter d and the counters 112 to 115 of the second counter e, and the first and second counters d and e complete their counting. At the same time that the first and second counters d and $e$ complete their counting in response to the transition from the logical 1 to 0 of the Q output signal of the D-type flip-flop 81a, the counters 16 and 17 start counting. The counters 16 and 17 provide the basis for generating clock pulses which control the operation of the divider circuit $f$ for calculating the wheel speed from the next counts of the first and second counters $d$ and $e$ and the differentiation circuit for calculating the acceleration or deceleration of the wheel. The counters 16 and 17 are connected in cascade and constitute an eight-bit counter as a whole. When the Q output signal of the D-type flip-flop 81a is at the logical 0, the counters 16 and 17 are reset to zero and the outputs of the respective bits in the counters 16 and 17 are all at the logical 0. As a result, the output of a NAND circuit 19 is at the logical 1, and the output signal of a RS flip-flop comprising NAND circuits 20 and 21 is at the logical 1. The output of the NAND circuit 21 is connected to one input terminal of a NAND circuit 13 and the reference pulses from the reference pulse generating circuit $b$ are supplied to the other input terminal of the NAND circuit 13. Consequently, at the instant that the Q output signal of the D-type flip-flop 81a changes from the logical 1 to 0 and brings the counting to an end, the counters 16 and 17 start to count the reference pulses through the NAND circuit 13 and a NOT circuit 14. The timing charts of the output signals of the respective bits in the counters 16 and 17 are shown at $t13$ to $t17$ in FIG. 5. The waveforms t13 to t17 show the output signals of the first to fifth bits of the eight-bit counter comprising the counters 16 and 17. The timing charts of the output signals generated at various points in the timing pulse generating circuit $h$ are shown at $t19$ to $t30$ in FIG. 5. When the first and second counters $d$ and $e$ complete their counting, the timing pulse generating circuit $h$ comes into operation as mentioned earlier and initiates the operation of division. As is well known to those skilled in the art, a divider circuit must be provided with registers for storing the divisor and dividend. In the present embodiment of this invention, the first and second counters $d$ and $e$ perform the functions of such registers to perform a 16-bit parallel operation. While the first counter $d$ utilizes the counters 88 and 89 for counting, the operation of division requires the use of the counters 86 and 87 in addition to the counters 88 and 89 of the first counter $d$ to form as a whole a 16-bit counter to correspond with the 16-bit second counter $e$. Consequently, while, with the counters 86 and 87, the clock pulses for the operation of division comprises 12 pulses as shown at t28 in FIG. 5, the clock pulses for the counters 88, 89 in the first counter $d$ are provided as the inclusive or (hereinafter referred to as an OR) of the speed sensor output pulses synchronized with the reference pulses and the clock pulses $t28$ through a NAND circuit 79 and a NOT circuit 80. In the dual D-type flip-flop 82 which is a division controlling flip-flop, the $\bar{Q}$ output signal of the D-type flip-flop 81a is applied to the preset input terminal of one D-type flip-flop 82b. When starting the process of division, the $\bar{Q}$ output signal of the D-type flip-flop 81a changes from the logical 0 to 1 and the Q output signal of the D-type flip-flop 82b changes from the logical 0 to 1. This Q output signal of the D-type flip-flop 82b is applied to exclusive OR's 103 to 110, and the $\bar{Q}$ output signal of the D-type flip-flop 82b is applied through a NOT circuit 83 to exclusive OR's 90 to 97 and to the carry input terminal of the full adders 99 to 102 constituting as a whole a 16-bit full adder (i.e., the carry input terminal of the full adder 99). The Q output signal of the D-type flip-flop 82b and its $\bar{Q}$ output signal through the NOT circuit 83 constitute the control signals for the process of division. Thus, when these signals are logical 0's the next step will be an addition, whereas when these signals are logical 1's the next step will be a subtraction. Consequently, since the Q output signal of the D-type flip-flop 82b and the output signal of the NOT circuit 83 change from the logical 0 to 1 at the end of the counting, if the counts of the first and second counters $d$ and $e$ are respectively represented as above-mentioned NN and NT, the NT is complemented by the exclusive OR's 90 to 97 and 103 to 110 and it is applied to the full adders 99 to 102. Therefore, the subtraction NN−NT takes place first. Assuming that $\Sigma 1$ represents the result of the first subtraction which has been shifted one bit in the direction of the higher order significant bits, if NN−NT $\geq$ 0, then the Q output signal of the D-type flip-flop 82b changes from the logical 0 to 1 and the second step is the subtraction of $\Sigma 1 - $ NT, whereas if NN − NT < 0, then the output signal of the D-type flip-flop 82b is at the logical 0 and the second step is the addition $\Sigma 1 + $ NT. Similarly, a total of 12 steps take place. The exclusive OR's 90 to 97 and 103 to 110 are provided so that if $\Sigma i -$ NT $\geq 0$ ($i = 1$ to 12) the NT is complemented and applied to the full adders 99 to 102, whereas if $\Sigma i -$ NT < 0 the NT is applied as such to the full adders 99 to 102. Numerals 120 and 121 designate quotient registers for storing the carries of the full adders 99 to 102, and their stored contents represent the quotient of a division. Numerals 137 and 138 designate D-type flip-flops for retaining the stored contents of the quotient registers 120 and 121, 128 to 130 full adders for producing the differentiated output.

In other words, at the end of the counting, a newly obtained quotient is stored in the quotient registers 120 and 121 (the stored contents are represented as V2), and the quotient obtained from the division during the preceeding cycle is stored in the D-type flip-flops 137 and 138 (the stored contents are represented as V1). The quotient registers 120 and 121 and the D-type flip-flops 137 and 138 are connected to the respective input terminals of the full adders 128 to 130. In this case, the stored contents V2 of the quotient registers 120 and 121 are complemented by NOT circuits 122 to 127 and 131 to 136 and they are then applied to the input terminals of the full adders 128 to 130.

Consequently, if $D$ represents the differentiated output, then the following subtraction takes place $$D = V1 - V2$$

The result of this subtraction, i.e., the differentiated output is stored in the D-type flip-flops 139 and 140 and it is produced from the output terminals of the D-type flip-flops 139 and 140. Accordingly, the wheel speed is produced from an output terminal 10 and the acceleration or deceleration of the wheel is produced from an output terminal 11.

We claim:

1. A digital differentiation circuit for differentiating a frequency proportional to a detected displacement speed, comprising:

a reference pulse generating circuit for generating reference pulses having a predetermined frequency;

a displacement speed detector for generating output pulses having a frequency proportional to a detected displacement speed;

a timing pulse generating circuit for recurrently generating a reference timing pulse having a predetermined reference time width;

a synchronization circuit connected to said timing pulse generating circuit, said reference pulse generating circuit and said displacement speed detector whereby the leading edge of said reference timing pulse is synchronized with the leading edge of said detector output pulse and the leading edge of said reference pulse to continuously generate said reference pulse and said detector output pulse synchronized with each other during a counting period extending from the leading edge of said synchronized reference timing pulse to the trailing edge thereof which was extended to the first leading edge of said detector output pulse generated after the termination of the reference time width of said reference timing pulse;

a first counter connected to said synchronization circuit whereby the number of said detector output pulses generated during said counting period is counted repeatedly for each said counting period;

a second counter connected to said synchronization circuit whereby the number of said reference pulses generated during said counting period is counted repeatedly for each said counting period;

a divider circuit connected to said first and second counters whereby every time said counting period terminates, the count of said first counter is divided by the count of said second counter to obtain a displacement speed; and a subtractor circuit connected to said divider circuit whereby every time a displacement speed is computed by said divider circuit, a subtraction is performed on said computed displacement speed and a just previously obtained displacement speed to determine an acceleration or deceleration of said detected displacement speed.

2. A digital differentiation circuit according to claim 1 further comprising an initial value setting circuit connected between said displacement speed detector and said synchronization circuit, whereby when a displacement speed detected by said displacement speed detector is smaller than a predetermined value, a predetermined pulse of a frequency lower than a predetermined value is applied as an output pulse of said displacement speed detector, whereas when said detected displacement speed is greater than said predetermined value, the output pulse of said displacement speed detector is directly applied to said synchronization circuit.

3. A digital differentiation circuit according to claim 1, wherein said displacement speed detector comprises a speed sensor for generating output pulses having a frequency corresponding to a detected vehicle speed.

4. A digital differentiation circuit according to claim 3, wherein said divider circuit is provided with a displacement speed output terminal for delivering to the outside a displacement speed computed by said divider circuit.

5. A digital differentiation circuit according to claim 1, wherein said synchronization circuit comprises a detector output pulse synchronizing flip-flop having a clock terminal connected to said reference pulse generating circuit, an input terminal connected to said displacement speed detector and an output terminal whereby said detector output pulse having the leading edge thereof synchronized with the leading edge of said reference pulse is generated at said output terminal, a reference timing pulse synchronizing flip-flop having a clock terminal connected to the output of said detector output pulse synchronizing flip-flop, an input terminal connected to said timing pulse generating circuit and an output terminal whereby the leading edge of said reference timing pulse is synchronized with the leading edge of said synchronized detector output pulse and the trailing edge of said reference timing pulse is extended to the leading edge of said synchronized detector output pulse generated immediately after the termination of the reference time width of said reference timing pulse to produce an extended synchronized reference timing pulse at said output terminal, a first logic gate circuit having input terminals respectively connected to said flip-flops and an output terminal connected to said first counter and adapted to be opened by said synchronized reference timing pulse to apply said synchronized detector output pulses to said first counter, and a second logic gate circuit having a first input terminal connected to said reference timing pulse synchronizing flip-flop, a second input terminal connected to said reference pulse generating circuit and an output terminal connected to said second counter and adapted to be opened by said synchronized reference timing pulse to apply said reference pulses to said second counter.

6. A digital differentiation circuit according to claim 5, wherein said second counter has a reset pulse output terminal provided at a selected one of the bit positions thereof for producing a reset pulse and a reset terminal, and wherein said timing pulse generating circuit comprises a timing setting counter having an input connected to said reference pulse generating circuit, a reset terminal connected to the output terminal of said reference timing time synchronizing flip-flop and an output terminal connected to the reset terminal of said second counter, said timing setting flip-flop being adapted to be reset by said synchronized reference timing pulse to count the number of said reference pulses and produce an output at said output terminal thereof when said count thereof reaches a predetermined value, and a timing setting flip-flop having a set terminal connected to the output terminal of said timing setting counter, a reset terminal connected to the reset pulse output terminal of said second counter and an output terminal connected to the input terminal of said reference timing pulse synchronizing flip-flop.

7. A digital differentiation circuit according to claim 6, wherein said first counter is provided with a reset terminal connected to the output terminal of said timing setting counter, and said timing pulse generating circuit includes a division controlling logic circuit connected between said timing setting counter and said divider circuit to bring said divider circuit into operation for a predetermined period of time after the resetting of said timing setting counter, and a subtraction controlling logic circuit connected between said timing setting counter and said subtractor circuit to bring said subtractor circuit into operation after the termination of the division by said divider circuit.

8. A digital differentiation circuit according to claim 2, wherein said displacement speed detector comprises a speed sensor for generating output pulses having a frequency corresponding to a detected vehicle speed.

9. A digital differentiation circuit according to claim 7, wherein said displacement speed detector comprises a speed sensor for generating output pulses having a frequency corresponding to a detected vehicle speed, and there is further provided an initial value setting circuit connected between said speed sensor and the input terminal of said detector output pulse synchronizing flip-flop whereby when a speed detected by said speed sensor is smaller than a predetermined value, a predetermined pulse signal of a frequency smaller than a predetermined one is applied as a detector output pulse to the input terminal of said detector output pulse synchronizing flip-flop, whereas when said detected speed is greater than said predetermined value, the output pulse of said speed sensor is directly applied to said detector output pulse synchronizing flip-flop.

* * * * *